(12) United States Patent
Kim et al.

(10) Patent No.: US 10,643,527 B2
(45) Date of Patent: May 5, 2020

(54) LENS AND DISPLAY APPARATUS HAVING THE SAME

(71) Applicant: SAMSUNG ELECTRONICS CO., LTD., Suwon-si (KR)

(72) Inventors: Sung Tae Kim, Seoul (KR); Shunsuke Kimura, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/072,397

(22) PCT Filed: Jan. 20, 2017

(86) PCT No.: PCT/KR2017/000737
§ 371 (c)(1),
(2) Date: Jul. 24, 2018

(87) PCT Pub. No.: WO2017/131396
PCT Pub. Date: Aug. 3, 2017

(65) Prior Publication Data
US 2019/0035327 A1 Jan. 31, 2019

(30) Foreign Application Priority Data
Jan. 25, 2016 (KR) .................. 10-2016-0008704

(51) Int. Cl.
*G09G 3/32* (2016.01)
*G02F 1/1335* (2006.01)
(Continued)

(52) U.S. Cl.
CPC .............. *G09G 3/32* (2013.01); *G02B 6/003* (2013.01); *G02B 6/009* (2013.01); *G02B 6/0021* (2013.01);
(Continued)

(58) Field of Classification Search
CPC ........ G09G 3/32; G02B 6/0025; G02B 6/003; G02B 6/0073; G02B 6/0021; G02B 6/009;
(Continued)

(56) References Cited

U.S. PATENT DOCUMENTS

2006/0102914 A1\* 5/2006 Smits ................ H01L 33/54
257/98
2006/0126343 A1 6/2006 Hsieh et al.
(Continued)

FOREIGN PATENT DOCUMENTS

| KR | 1020130062005 A | 6/2013 |
| KR | 1020140077292 A | 6/2014 |
| KR | 101500924 B1 | 3/2015 |

OTHER PUBLICATIONS

Written Opinion (PCT/ISA/237) dated Apr. 27, 2017 by the International Searching Authority in International Application No. PCT/KR2017/000737.
(Continued)

*Primary Examiner* — Abhishek Sarma
(74) *Attorney, Agent, or Firm* — Sughrue Mion, PLLC (57) ABSTRACT

Provided herein is a display apparatus including a light emitting diode and a lens for diffusing light generated from the light emitting diode. The lens includes a first emitting portion forming a first emitting surface, and a second emitting portion protruding from the first emitting portion and forming a second emitting surface, so that the light may be diffused by a protruding distance of the second emitting portion.

8 Claims, 6 Drawing Sheets

(51) Int. Cl.
     *G02F 1/13357*     (2006.01)
     *F21V 8/00*     (2006.01)

(52) U.S. Cl.
     CPC ......... *G02B 6/0025* (2013.01); *G02B 6/0073* (2013.01); *G02F 1/133606* (2013.01); *G02F 2001/133607* (2013.01)

(58) Field of Classification Search
     CPC ............ G02F 1/1335; G02F 1/133606; G02F 2001/133607
     See application file for complete search history.

(56)         References Cited

U.S. PATENT DOCUMENTS

2012/0086871 A1     4/2012   Yokota
2015/0192255 A1*   7/2015   Kim ........................ H01L 33/58
                                                 362/293

OTHER PUBLICATIONS

International Search Report (PCT/ISA/210), dated Apr. 27, 2017 by International Searching Authority in International Application No. PCT/KR2017/000737.

* cited by examiner

LENS AND DISPLAY APPARATUS HAVING THE SAME

TECHNICAL FIELD

The present disclosure relates to a lens for diffusing light generated in a light emitting diode and a display apparatus having the same.

BACKGROUND ART

In general, a display apparatus is an apparatus for displaying an image, such as a monitor or a television.

The display apparatus includes a display panel including a liquid crystal panel and a backlight for supplying light to the display panel.

Among recent display apparatuses, there is a display apparatus with a backlight that uses light emitting diodes as a light source.

The backlight applied to the display apparatus includes a printed circuit board disposed on a rear side of the display panel and a plurality of light emitting diodes disposed on the printed circuit board.

In addition, since the light emitting diode is a point light source, the light must be diffused to be uniformly supplied to all across the display panel. Therefore, the backlight includes lenses disposed on a front side of the light emitting diodes to diffuse light.

DISCLOSURE

Technical Problem

The present disclosure provides a lens capable of diffusing light more widely and a display apparatus having the same.

Technical Solution

In accordance with an aspect of the present disclosure, a display apparatus is provided. The display apparatus includes a display panel, and a backlight disposed on a rear side of the display panel to illuminate the display panel, wherein the backlight includes a light emitting diode and a lens to diffuse light emitted from the light emitting diode, wherein the lens includes an incidence portion recessed to face the light emitting diode on a rear side of the lens, a first emitting portion having a gradually decreasing diameter toward a front side, and a second emitting portion protruding forward from a central portion of the first emitting portion, wherein the first emitting portion includes a first emitting surface forming an outer circumferential surface of the first emitting portion to refract and emit the light transmitted through the first emitting portion, wherein the second emitting portion includes a second emitting surface forming a front surface of the second emitting portion to refract and emit the light transmitted through the second emitting portion, and wherein the incidence portion includes a first incidence surface to guide light generated from the light emitting diode toward the first emitting surface and a second incidence surface to guide the light generated from the light emitting diode toward the second emitting surface.

The first incidence surface, the second incidence surface, the first emitting surface, and the second emitting surface may be each formed as an aspheric surface.

The second incidence surface may be recessed on the rear surface of the first emitting portion to face the light emitting diode, and wherein the first incidence surface extends from a rear end of the second incidence surface to a rear side.

The second emitting portion may protrude from the first emitting portion in a cylindrical shape such that a front surface of the second emitting portion forms the second emitting surface, and wherein the second emitting portion includes a connecting surface forming an outer circumferential surface of the second emitting portion to connect the first emitting surface and the second emitting surface. In accordance with another aspect of the present disclosure, a lens is provided. The lens disposed on a front side of a light source for diffusing light emitted from the light source includes an incidence portion recessed to face the light source on a rear side of the lens, a first emitting portion having a gradually decreasing diameter toward a front side, and a second emitting portion protruding forward from a central portion of the first emitting portion, wherein the first emitting portion includes a first emitting surface forming an outer circumferential surface of the first emitting portion to refract and emit the light transmitted through the first emitting portion, wherein the second emitting portion includes a second emitting surface forming a front surface of the second emitting portion to refract and emit the light transmitted through the second emitting portion, and wherein the incidence portion includes a first incidence surface to guide light generated from the light emitting diode toward the first emitting surface and a second incidence surface to guide the light generated from the light emitting diode toward the second emitting surface.

Advantageous Effects

According to embodiments of the present disclosure, a display apparatus has a second emitting portion protruding from a central portion of a first emitting portion, to secure as long a distance the light may be diffused as the protruding distance of the second emitting portion, thereby enabling the light to be diffused more widely by the lens.

MODE FOR DISCLOSURE

Hereinafter, a display apparatus according to an embodiment of the present disclosure will be described in detail with reference to accompanying drawings.

Figure 1:
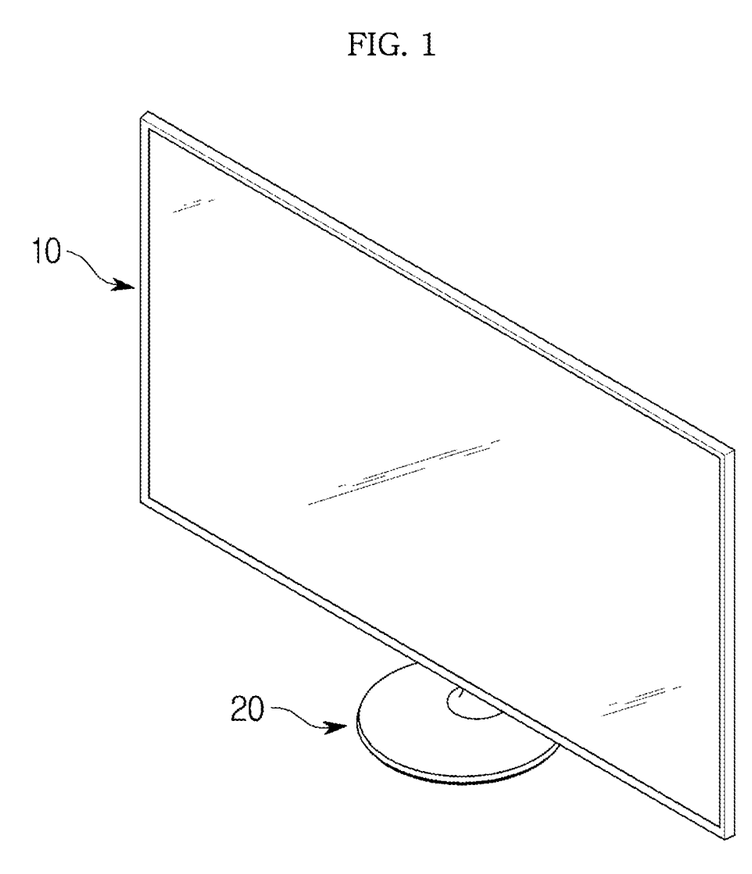
FIG. 1 is a perspective view illustrating a display apparatus according to an embodiment of the present disclosure.

Referring to FIG. 1, a display apparatus 1 according to an embodiment of the present disclosure includes a display unit 10 for displaying an image, and a stand 20 for placing the display unit 10 upright on a horizontal plane.

Figure 2:
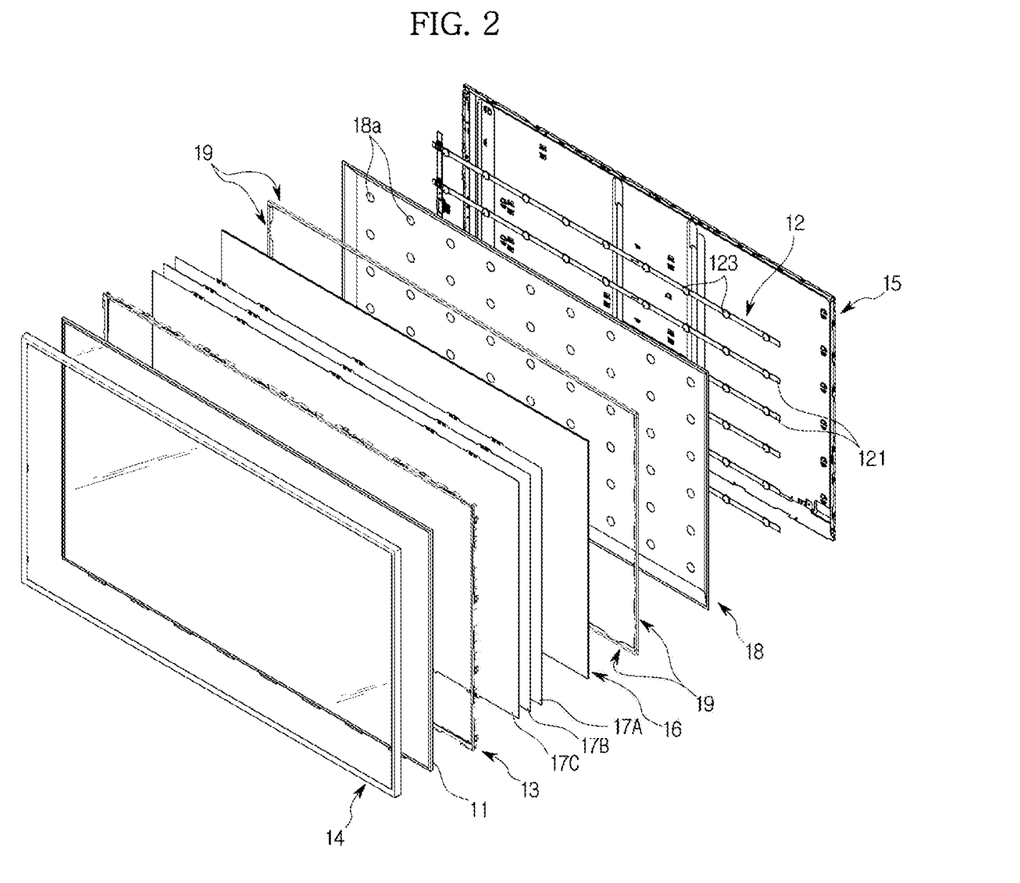
FIG. 2 is an exploded perspective view illustrating a display unit according to an embodiment of the present disclosure.
Figure 3:
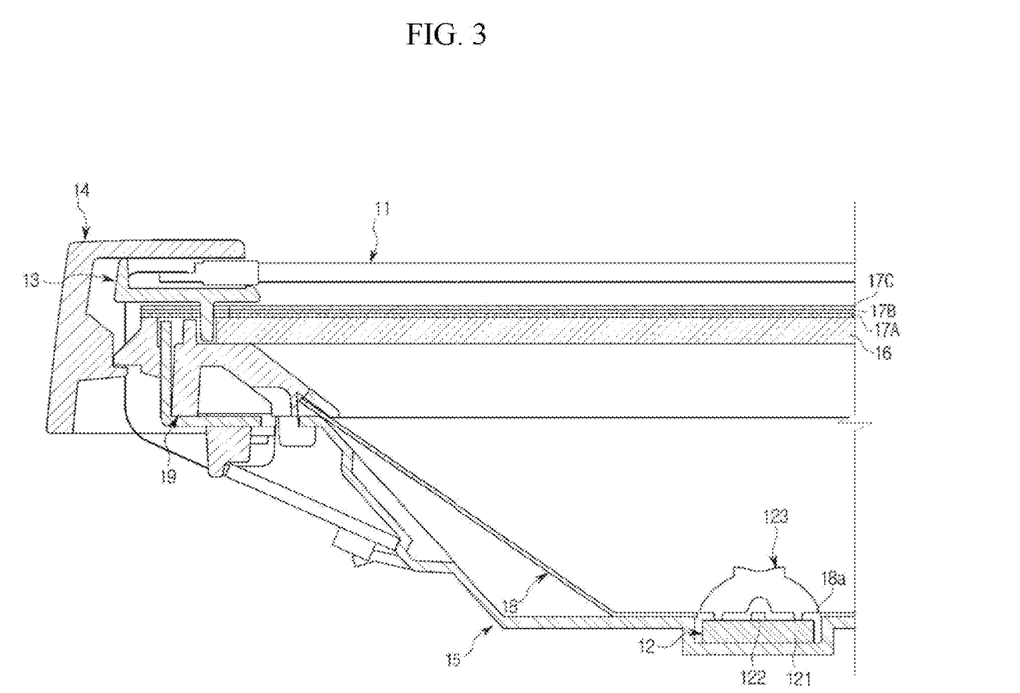
FIG. 3 is a cross-sectional view illustrating a display unit according to an embodiment of the present disclosure.

Referring to FIGS. 2 and 3, the display unit 10 includes a display panel 11 to form a screen, and a backlight 12 disposed on a rear side of the display panel 11 to supply light to the display panel 11.

The display unit 10 includes a middle mold 13 for supporting the display panel 11, a top chassis 14 for maintaining the display panel 11 to be supported on a front side of the middle mold 13, and a bottom chassis 15 that receives the backlight 12 and is coupled with the middle mold 13 to maintain the backlight 12 to be disposed on a rear side of the middle mold 13.

A diffusion member 16 for diffusing the light supplied from the backlight 12 and optical sheets 17A, 17B and 17C for improving optical properties of the light transmitted through the diffusion member 16 are disposed between the display panel 11 and the backlight 12.

The optical sheets 17A, 17B and 17C includes a diffusion sheet 17A for diffusing the light transmitted through the diffusion member 16, a prism sheet 17B for refracting and collecting the light transmitted from the diffusion sheet 17A, and a protective sheet 17C for protecting the prism sheet 17B.

The display panel 11 includes a liquid crystal panel formed by sealing a liquid crystal (not shown) between two glass substrates (not shown) provided with electrodes.

The backlight 12 includes a printed circuit board 121, a plurality of light emitting diodes 122 mounted on the printed circuit board 121 and serving as a light source for generating light, a plurality of light emitting diodes 122, and a lens 123 installed on front of each of the plurality of light emitting diodes 122 for diffusing light generated from the light emitting diode 122.

The printed circuit board 121 includes a plurality of printed circuit boards 121 formed in a square bar shape and vertically spaced from each other. The plurality of light emitting diodes 122 are spaced apart from each other on a plurality of printed circuit boards 121. Therefore, the light emitting diodes 122 are vertically and horizontally spaced apart from each other on a rear side of the display panel 11.

In this embodiment, the printed circuit board 121 is formed in a square bar shape. However, the present invention is not limited thereto. The printed circuit board 121 may be formed in a flat plate shape.

The lens 123 is disposed on the front side of the light emitting diodes 122 to diffuse the light generated by the light emitting diode 122, so that the light may be transmitted to the display panel in a uniform distribution.

Figure 4:
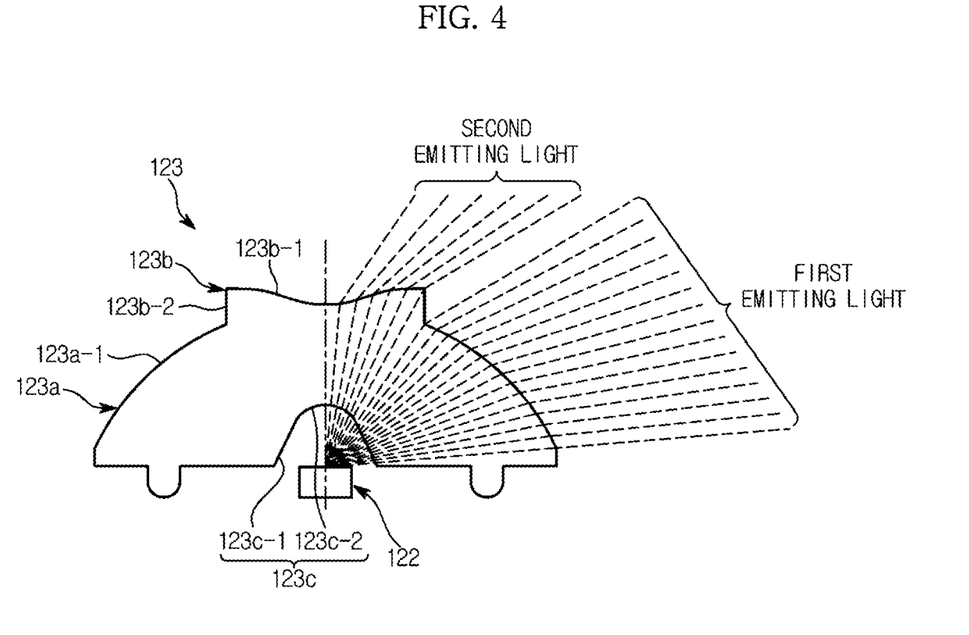
FIG. 4 is a cross-sectional view illustrating the installation structure of a lens and a light emitting diode applied to a display apparatus according to an embodiment of the present disclosure.
Figure 5:
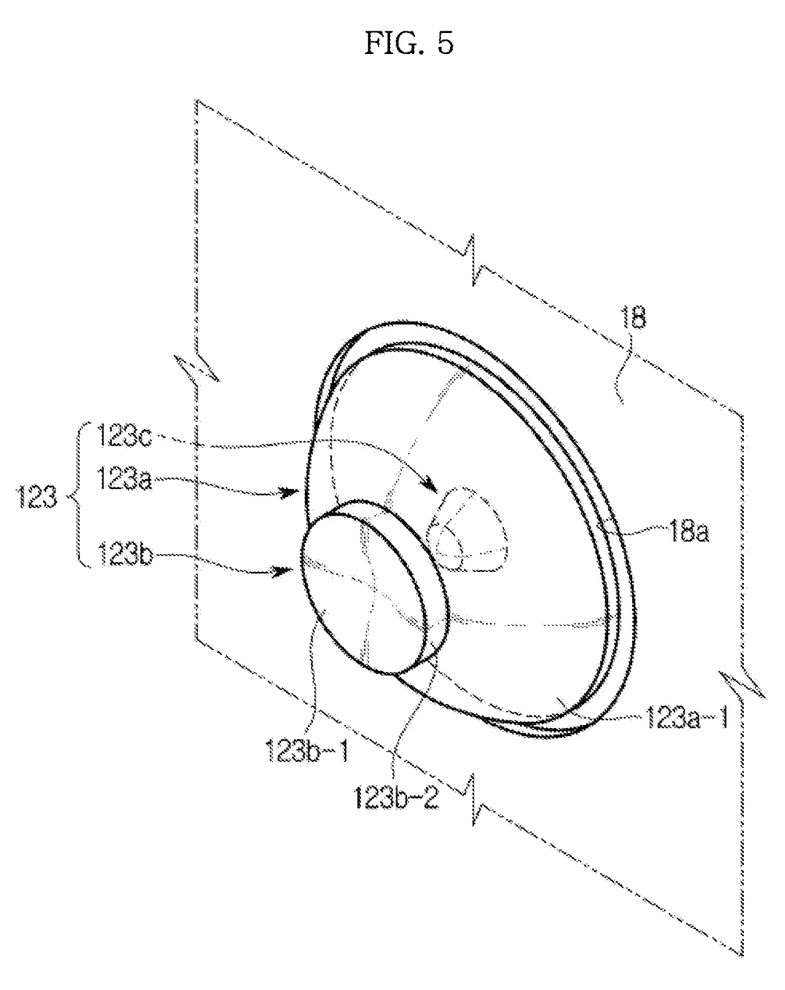
FIG. 5 is a perspective view illustrating a lens applied to a display apparatus according to an embodiment of the present disclosure.

Referring to FIGS. 4 and 5, the lens 123 includes a first emitting portion 123a that forms a rear side of the lens 123 that is adjacent to the light emitting diode 122 and has a gradually decreasing diameter toward the front side, a first emitting portion 123b protruding forward from a front central portion of the first emitting portion 123a, and an incidence portion 123c recessed on the rear surface facing the light emitting diode 122 for allowing the light generated by the light emitting diode 122 to be incident into the lens 123.

The first emitting portion 123a is formed to have the gradually decreasing diameter from the rear side toward the front side as described above. An outer circumferential surface of the first emitting portion 123a forms a first emitting surface 123a-1 for allowing light to be emitted toward the display panel 11. The first emitting surface 123a-1 refracts and emits light transmitted through an inside of the first emitting portion 123a. Therefore, the first emitting surface 123a-1 is formed as an aspheric surface to adjust a refraction angle of light passing through the first emitting surface 123a-1, so that the light emitted through the first emitting surface 123a-1 may be diffused.

The first emitting portion 123b is formed in a substantially cylindrical shape to protrude from the front central portion of the first emitting portion 123a. A front surface of the first emitting portion 123b forms a second emitting surface 123b-1 to refract and emit the light toward the display panel 11. The outer circumferential surface of the first emitting portion 123b forms a connecting surface 123b-2 connecting the first emitting surface 123a-1 and the second emitting surface 123b-1.

The second emitting surface 123b-1 refracts and emits the light transmitted through the inside of the first emitting portion 123b toward the display panel 11. Therefore, the second emitting surface 123b-1 is formed as an aspheric surface to adjust the refraction angle of the light passing through the second emitting surface 123b-1, so that the light emitted through the second emitting surface 123b-1 is widely diffused.

Figure 6:
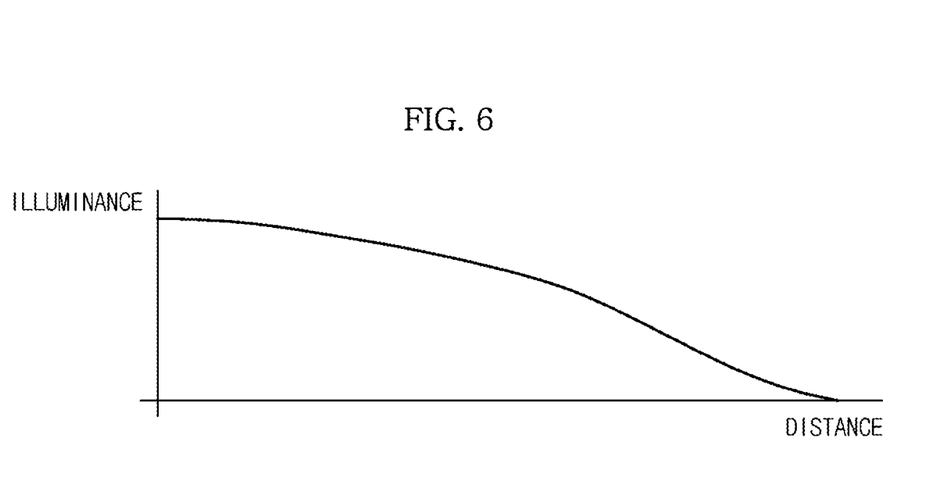
FIG. 6 is a graph illustrating the distribution of light diffused by a lens according to an embodiment of the present disclosure.

The first emitting surface 123a-1 and the second emitting surface 123b-1 are designed to combine first emitting light emitted through the first emitting surface 123a-1 and second emitting light emitted through the second emitting surface 123b-1, so that the light emitted through the lens 123 has a continuous distribution as shown in FIG. 6.

The incidence portion 123c is formed as a recess recessed on the rear surface of the first emitting portion 123a. In this embodiment, the incidence portion 123c includes a first incidence surface 123c-1 for guiding the light transmitted from the light emitting diode 122 disposed on the rear side of the lens 123 to the first emitting surface 123a-1, and a second incidence surface 123c-2 for guiding the light transmitted from the light emitting diode 122 disposed on the rear side of the lens 123 to the second emitting surface 123b-1.

The second incidence surface 123c-2 is formed in the shape of a recess concaved on the front side of the light emitting diode 122. The first incidence surface 123c-1 extends with a curvature from a rear end of the second incidence surface to the rear side.

The first incidence surface 123c-1 and the second incidence surface 123c-2 are each formed to be curved as an aspheric surface to adjust the angle of refraction of the light incident into the lens 123 through the first incidence surface 123c-1 and the second incidence surface 123c-2, so that the light is guided to the first emitting surface 123a-1 and the second emitting surface 123b-1. That is, the light incident and refracted through the first incidence surface 123c-1 is guided to the first emitting surface 123a-1, and the light incident and refracted through the second incidence surface 123c-2 is guided to the second emitting surface 123b-1.

Accordingly, some of the light generated by the light emitting diode 122 is incident and refracted through the first incidence surface 123c-1 and guided to the first emitting surface 123a-1, and then the light is refracted and emitted through the first emitting surface 123a-1 formed as the aspheric surface, so that the light is diffused.

The remaining light generated by the light emitting diode 122 is incident and refracted through the second incidence surface 123c-2 and guided to the second emitting surface 123b-1, and then the light is refracted and emitted through the second emitting surface 123b-1.

Here, the first emitting surface 123a-1 and the second emitting surface 123b-1 are designed to have the light emitted by an inner end of the first emitting surface 123a-1 and the light emitted by the outer end of the second emitting surface 123b-1 combined continuously. Therefore, a distribution of the light diffused by the lens 123 is continuously reduced from a center to an outer side as shown in FIG. 6.

As described above, when the first emitting portion 123b is formed to protrude from the first emitting portion 123a, a distance that the light may be diffused may be secured as long as the protruding distance of the first emitting portion 123a.

Accordingly, the light is diffused more widely by the protruding distance of the first emitting portion 123b while the light is transmitted from the second incidence surface 123c-2 to the second emitting surface 123b-1. The light is refracted and diffused again while the light is emitted through the second emitting surface. Therefore, the light may be diffused more widely.

As described above, the light may be more efficiently diffused by forming the first emitting portion 123a and the first emitting portion 123b protruding forward from the first emitting portion 123a.

The connecting surface 123b-2 is a surface connecting the first emitting surface 123a-1 and the second emitting surface 123b-1. As described above, since the light is guided to the first emitting surface 123a-1 and the second emitting surface 123b-1 by the first incidence surface 123c-1 and the second incidence surface 123c-2, the first incidence surface 123c-1 and the second incidence surface 123c-2 are designed not to transmit light to the connecting surface 123b-2.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A display apparatus comprising:
    a display panel; and
    a backlight disposed on a rear side of the display panel to illuminate the display panel,
    wherein the backlight includes a light emitting diode and a lens to diffuse light emitted from the light emitting diode,
    wherein the lens includes an incidence portion recessed to face the light emitting diode on a rear side of the lens, a first emitting portion having a gradually decreasing diameter toward a front side, and a second emitting portion protruding forward from a central portion of the first emitting portion,
    wherein the first emitting portion includes a first emitting surface forming an outer circumferential surface of the first emitting portion to refract and emit the light transmitted through the first emitting portion,
    wherein the second emitting portion includes a second emitting surface forming a front surface of the second emitting portion to refract and emit the light transmitted through the second emitting portion,
    wherein the incidence portion includes a first incidence surface to guide the light emitted from the light emitting diode toward the first emitting surface and a second incidence surface provided at a central portion of the first incidence surface to guide the light generated from the light emitting diode toward the second emitting surface, and
    wherein the second incidence surface has a concave shape that is recessed toward the front side.

2. The display apparatus according to claim 1, wherein the first incidence surface, the second incidence surface, the first emitting surface, and the second emitting surface are each formed as an aspheric surface.

3. The display apparatus according to claim 1, wherein the second incidence surface faces the light emitting diode, and
    wherein the first incidence surface extends from a rear end of the second incidence surface to a rear side.

4. The display apparatus according to claim 1, wherein the second emitting portion protrudes from the first emitting portion in a cylindrical shape such that the front surface of the second emitting portion forms the second emitting surface, and
    wherein the second emitting portion includes a connecting surface forming an outer circumferential surface of the second emitting portion to connect the first emitting surface and the second emitting surface.

5. A lens disposed on a front side of a light source for diffusing light emitted from the light source comprising:
    an incidence portion recessed to face the light source on a rear side of the lens;
    a first emitting portion having a gradually decreasing diameter toward a front side; and
    a second emitting portion protruding forward from a central portion of the first emitting portion,
    wherein the first emitting portion includes a first emitting surface forming an outer circumferential surface of the first emitting portion to refract and emit the light transmitted through the first emitting portion,
    wherein the second emitting portion includes a second emitting surface forming a front surface of the second emitting portion to refract and emit the light transmitted through the second emitting portion,
    wherein the incidence portion includes a first incidence surface to guide the light emitted from the light source toward the first emitting surface and a second incidence surface provided at a central portion of the first incidence surface to guide the light generated from the light source toward the second emitting surface, and
    wherein the second incidence surface has a concave shape that is recessed toward the front side.

6. The lens according to claim 5, wherein the first incidence surface, the second incidence surface, the first emitting surface, and the second emitting surface are each formed as an aspheric surface.

7. The lens according to claim 5, wherein the second incidence surface faces the light source, and
    wherein the first incidence surface extends from a rear end of the second incidence surface to a rear side.

8. The lens according to claim 5, wherein the second emitting portion protrudes from the first emitting portion in a cylindrical shape such that the front surface of the second emitting portion forms the second emitting surface, and
    wherein the second emitting portion includes a connecting surface forming an outer circumferential surface of the second emitting portion to connect the first emitting surface and the second emitting surface.

* * * * *